Aug. 9, 1966      G. C. MAYER      3,265,140

CHECKWEIGHING APPARATUS

Filed March 3, 1965      9 Sheets-Sheet 1

INVENTOR
GERALD C. MAYER

BY Norris & Bateman
ATTORNEYS

Aug. 9, 1966  G. C. MAYER  3,265,140
CHECKWEIGHING APPARATUS
Filed March 3, 1965  9 Sheets-Sheet 2
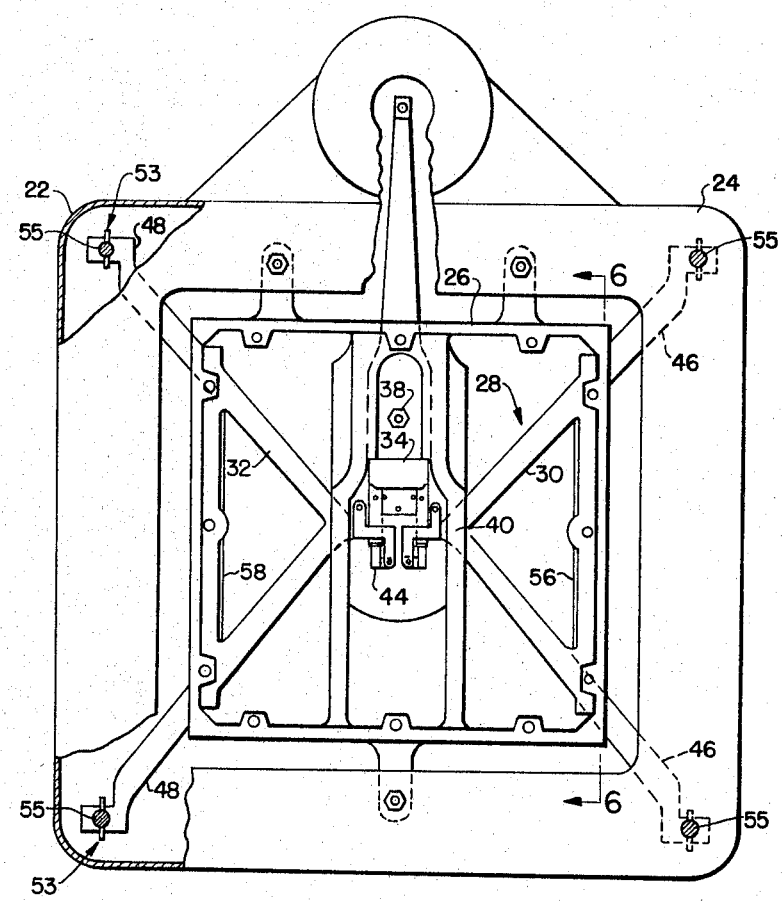
INVENTOR
GERALD C. MAYER
BY *Norris & Bateman*
ATTORNEYS

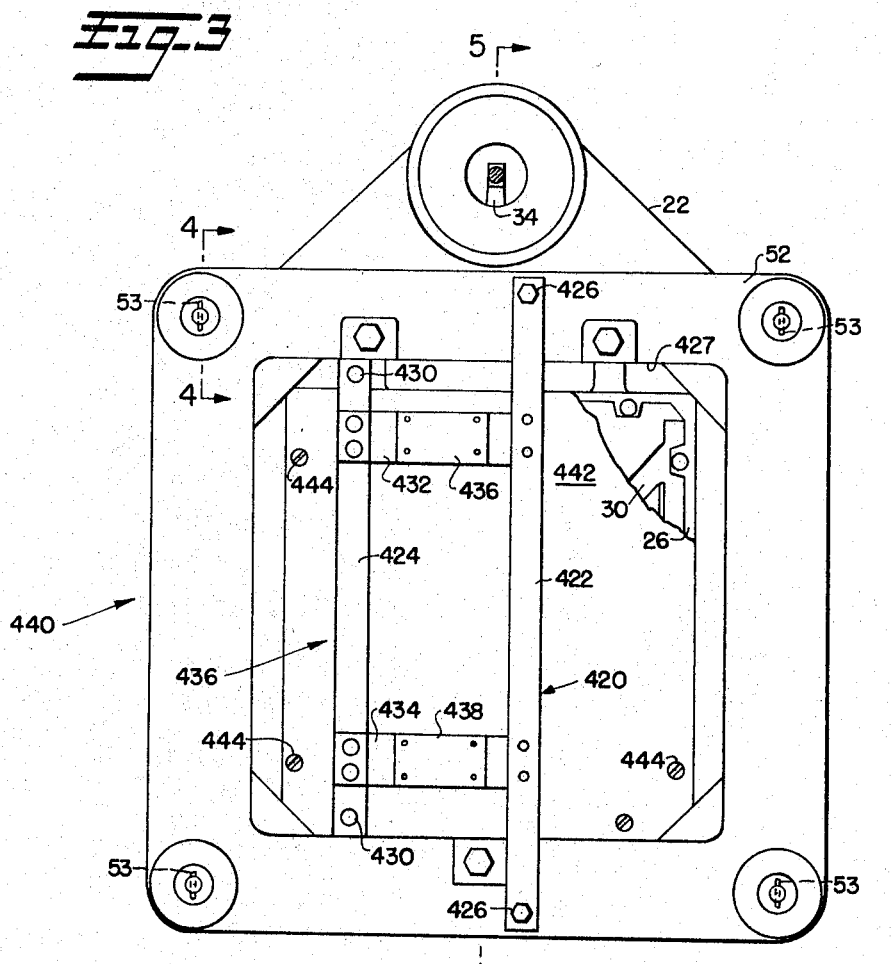
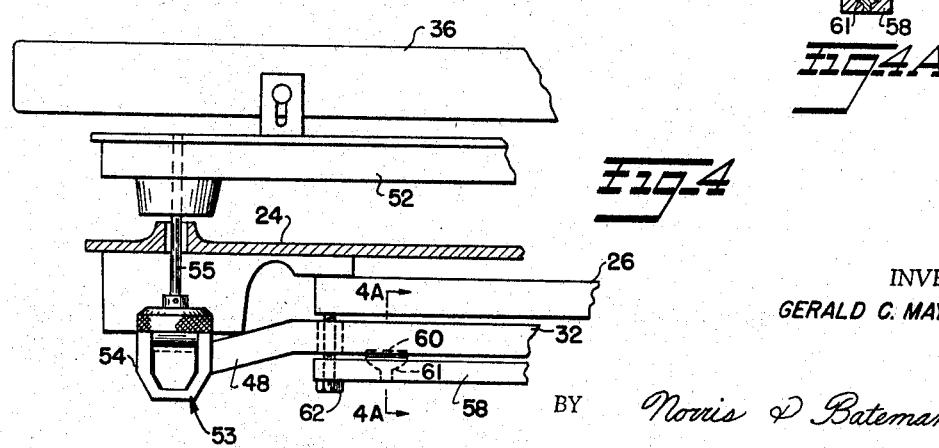

Aug. 9, 1966   G. C. MAYER   3,265,140
CHECKWEIGHING APPARATUS
Filed March 3, 1965   9 Sheets-Sheet 4
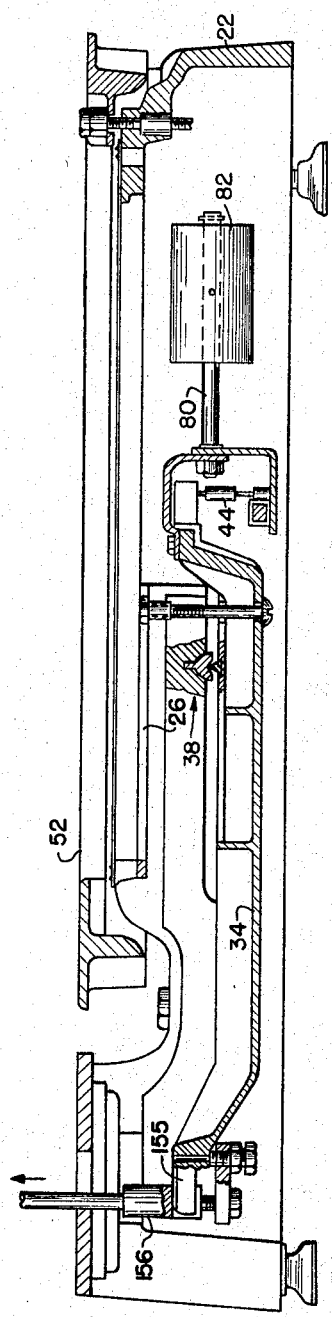
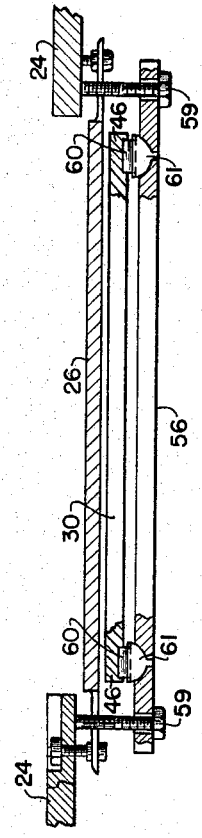
INVENTOR
GERALD C. MAYER
BY Norris & Bateman
ATTORNEYS

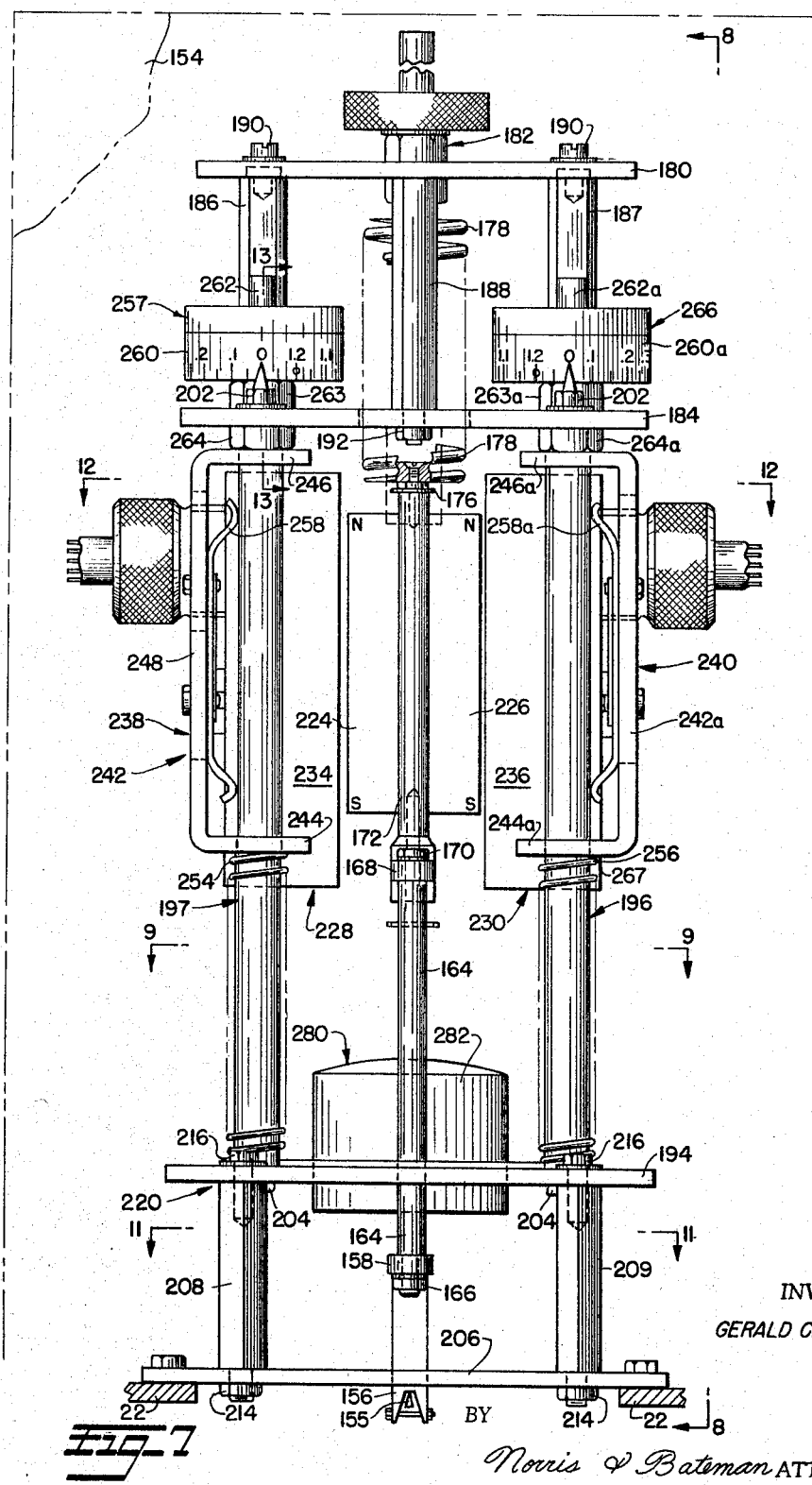

Aug. 9, 1966   G. C. MAYER   3,265,140
CHECKWEIGHING APPARATUS
Filed March 3, 1965   9 Sheets-Sheet 6
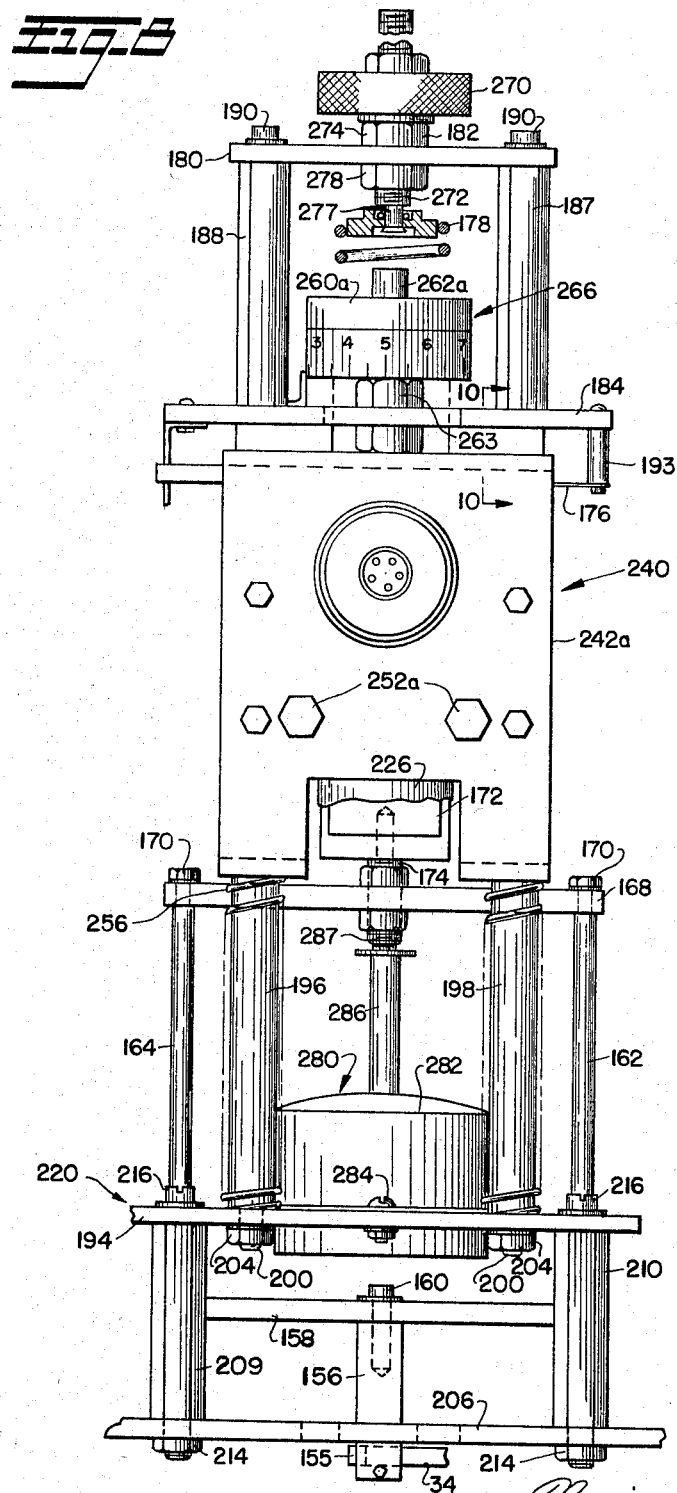
INVENTOR
GERALD C. MAYER
Norris & Bateman
ATTORNEYS Aug. 9, 1966    G. C. MAYER    3,265,140
CHECKWEIGHING APPARATUS
Filed March 3, 1965    9 Sheets-Sheet 7
Fig.9
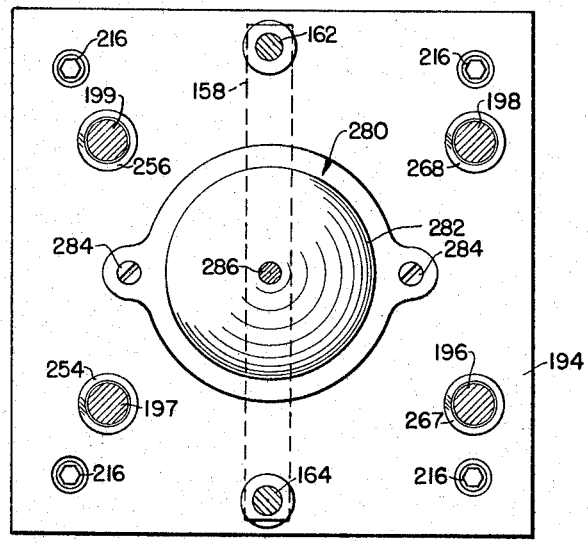
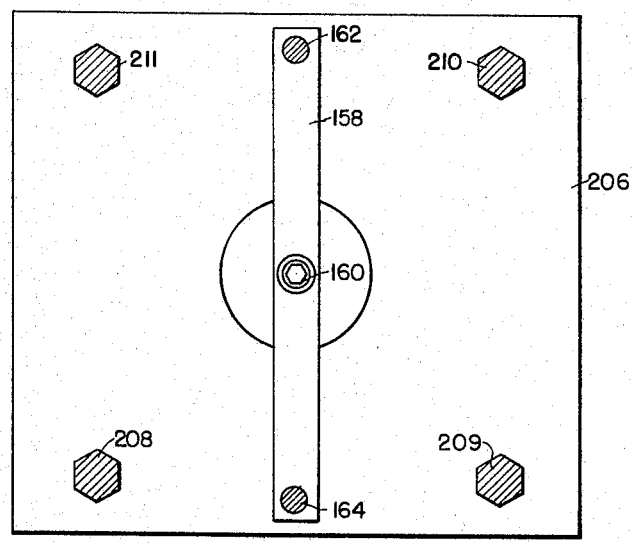
Fig.11
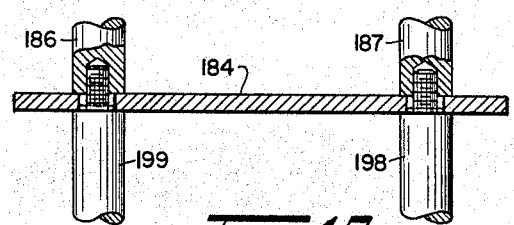
Fig.10
INVENTOR
GERALD C. MAYER
BY *Norris & Bateman*
ATTORNEYS Aug. 9, 1966　　　　　G. C. MAYER　　　　　3,265,140
CHECKWEIGHING APPARATUS
Filed March 3, 1965　　　　　　　　　　　9 Sheets-Sheet 8
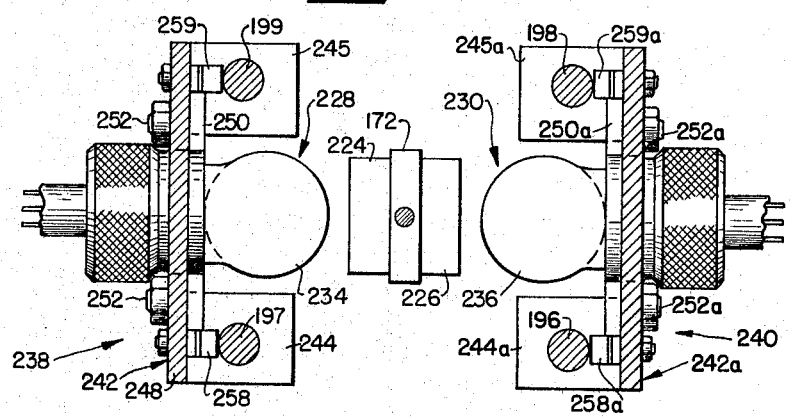
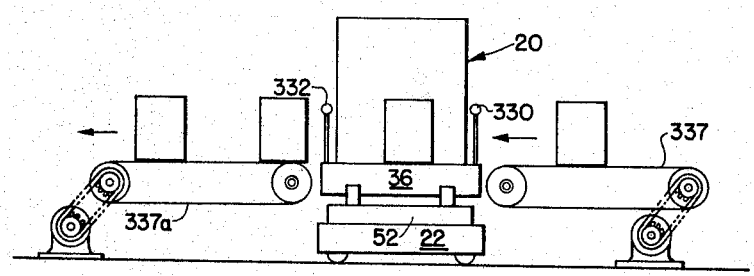
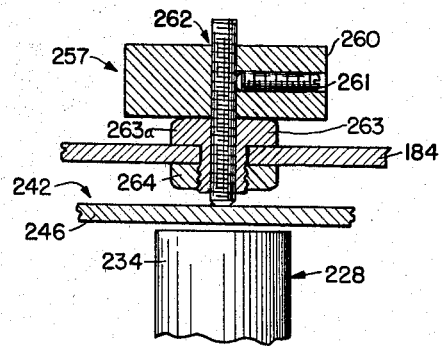
INVENTOR
GERALD C. MAYER
BY *Norris & Bateman*
ATTORNEYS

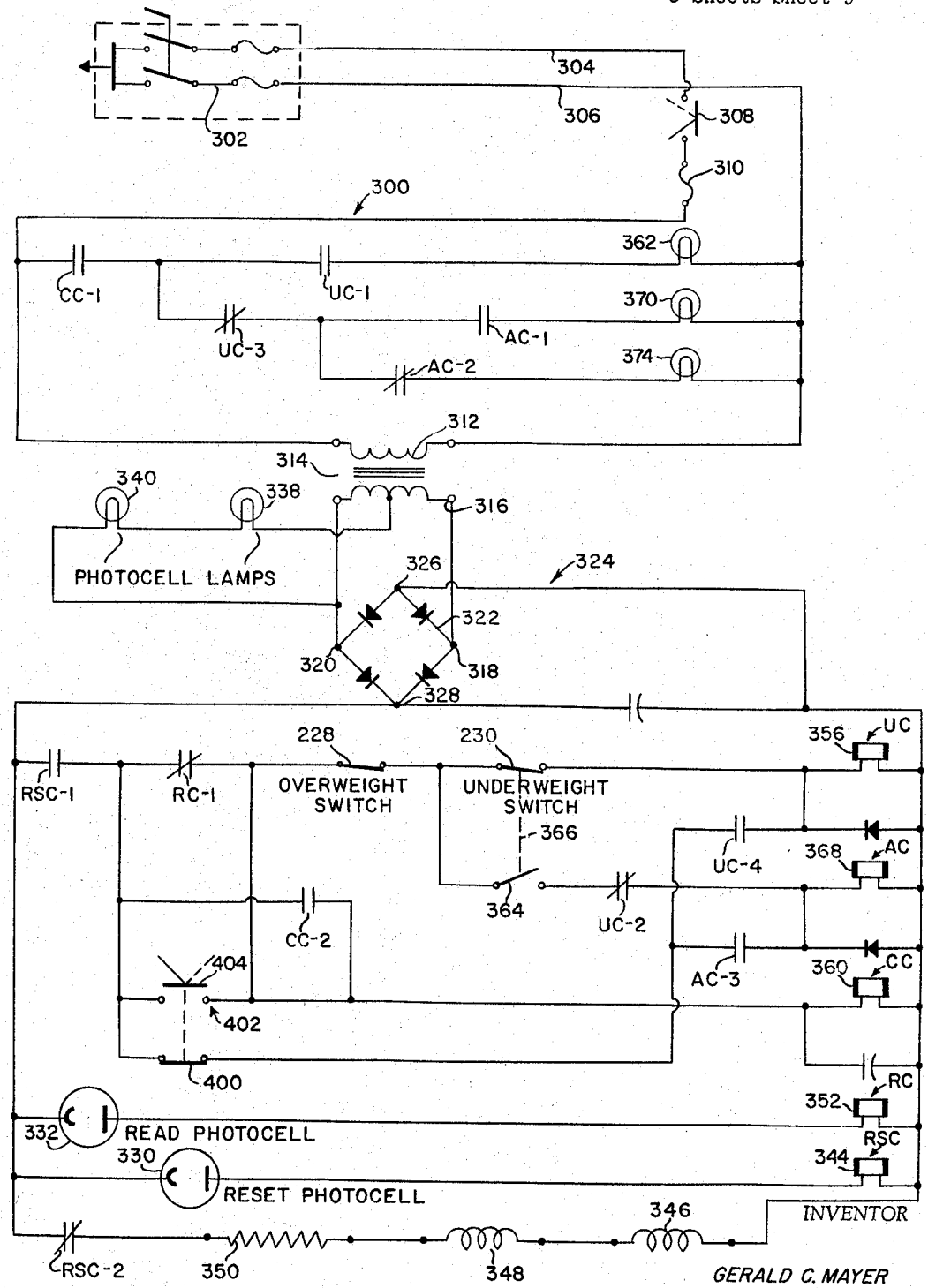

United States Patent Office 3,265,140
Patented August 9, 1966

3,265,140
CHECKWEIGHING APPARATUS
Gerald C. Mayer, Wayne, N.J., assignor to Howe Richardson Scale Company, Clifton, N.J., a corporation of Delaware
Filed Mar. 3, 1965, Ser. No. 436,782
19 Claims. (Cl. 177—46)

The present invention relates to checkweighing apparatus and more particularly to automatic checkweighing machines for checking the weights of loads or contents in packages, bags, cartons, containers, or the like and for classifying them as underweight, overweight, or acceptable.

In the recent past, an increasing need has developed in various industries for high-speed checkweighing systems. Prior art checkweighers for rapidly and accurately checking the weights of packages or the like to meet this need typically include complicated electronic control circuits which are expensive to manufacture and which are apt to frequently function unreliably.

Accordingly, it is a major object of this invention to provide a novel high-speed, automatic checkweighing apparatus which is relatively inexpensive to manufacture and which is highly reliable in operation.

More specifically the present invention contemplates a novel, efficiently organized, easily assembled checkweighing apparatus having a simplified electrical control circuit which does not incorporate electronic devices such as tubes, transistors, or the like.

A more specific object of this invention is to provide a novel high-speed checkweighing apparatus having a pair of switches which are magnetically actuated for respectively signalling underweight and overweight conditions of loads successively weighed by a scale.

Further objects of this invention will appear as the description proceeds in connection with the annexed claims and appended drawings wherein:

FIGURE 2 is a section taken substantially along lines 2—2 of FIGURE 1;

FIGURE 3 is a section taken substantially along lines 3—3 of FIGURE 1;

FIGURES 4 and 4A are sections taken respectively along lines 4—4 of FIGURE 3 and along lines 4A—4A of FIGURE 4;

FIGURE 5 is a section taken substantially along lines 5—5 of FIGURE 3;

FIGURE 6 is a section taken substantially along lines 6—6 of FIGURE 2;

FIGURE 7 is a rear elevation of the checkweighing apparatus shown in FIGURE 1 with the cabinet cover plate partially broken away to show interior details;

FIGURE 8 is a section taken substantially along lines 8—8 of FIGURE 7;

FIGURE 9 is a section taken substantially along lines 9—9 of FIGURE 7;

FIGURE 10 is a section taken substantially along lines 10—10 of FIGURE 8;

FIGURE 11 is a section taken substantially along lines 11—11 of FIGURE 7;

FIGURE 12 is a section taken substantially along lines 12—12 of FIGURE 7;

FIGURE 13 is a section taken substantially along lines 13—13 of FIGURE 7;

FIGURE 14 is a schematic diagram of the control and signalling circuit for the checkweighing apparatus shown in FIGURE 1; and FIGURE 15 is a front elevation of the checkweighing apparatus shown in FIGURE 1 and disposed between feed and take-away, motor driven conveyors.

Figure 1:
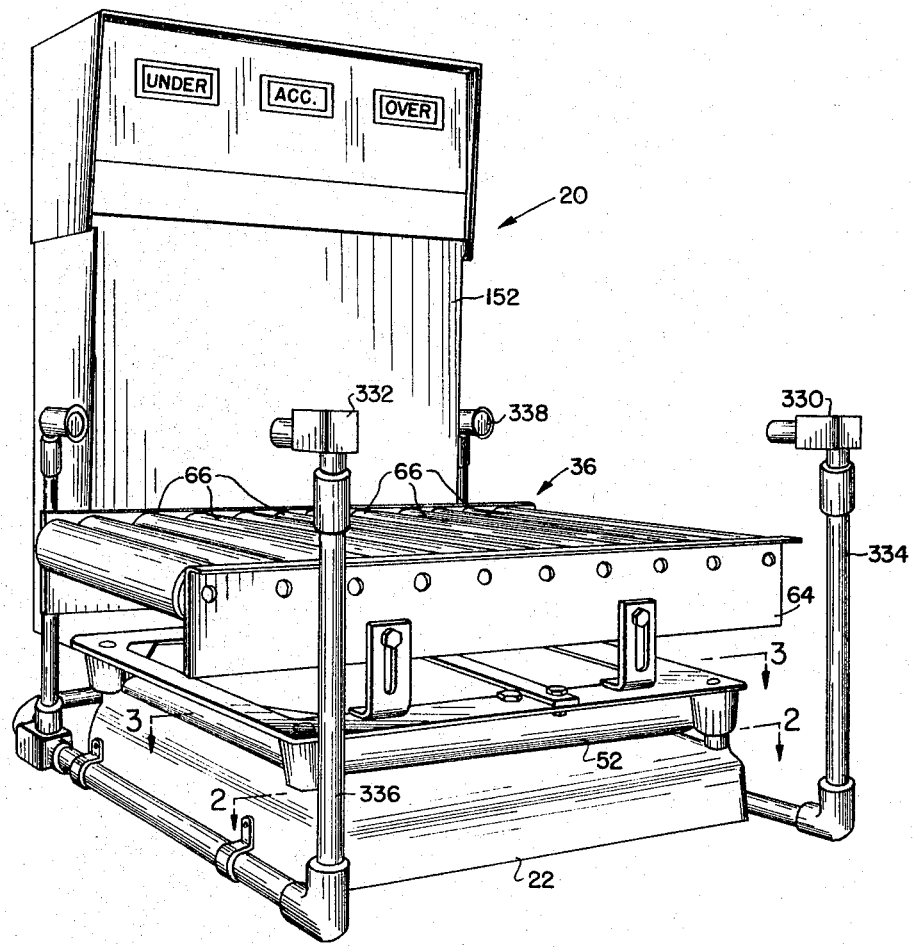
FIGURE 1 is a perspective view of the checkweighing apparatus of this invention as seen from the front, left corner.

Referring now to the drawings and more particularly to FIGURES 1 and 2, the reference numeral 20 generally designates a checkweighing apparatus incorporating the present invention and comprising a rigid, cast base 22 having a rectangularly apertured top section 24. A rigid rectangular understructure 26 for mounting a conventional three-lever system 28 is suitably fixed to base 22 below the aperture in top plate section 24. System 28, as best shown in FIGURE 2, comprises a pair of triangularly shaped, main levers 30 and 32 and a transverse lever 34. Lever 34 extends transversely with respect to the direction of movement of packages over a load platform assembly 36 and is pivotally suspended by a suitable fulcrum assembly 38 from a cross piece 40 which is preferably formed integral with understructure 26. The pivot axis of lever 34 is essentially parallel to the direction of movement of packages over platform assembly 36.

Main levers 30 and 32 are disposed on opposite sides of transverse lever 34 with their apexes facing each other in a butterfly configuration to define four rectangularly related corners of lever system 28. Main levers 30 and 32 are pivotally connected at their adjacent apexes to lever 34 a short linear distance forwardly from the transverse lever fulcrum axis by a conventional, motion transmitting compression link assembly 44. As is well known, upward swinging movement of the apexes of main levers 30 and 32 is transmitted by compression link assembly 44 for urging lever 34 in a counterclockwise direction as viewed from FIGURE 5. Similarly, downward movement of the main lever apexes is transmitted by assembly 44 to swing lever 34 in a clockwise direction.

With continued reference to FIGURES 1, 2, and 4, levers 30 and 32 are provided with diagonal arms respectively indicated at 46 and 48. Arms 46 and 48 extend to the corners of base 22 as best shown in FIGURE 2. A platform carrier 52 is supported on arms 46 and 48 by four load bearing and knife edge assemblies indicated at 53 and disposed at the diagonally related corners of lever system 28. Each of the assemblies 53, as best shown in FIGURE 4, comprises a knife edge bearing 54 seated on one of the lever arms 46, 48 and secured to a rod 55. The rods 55 of assemblies 53 extend upwardly and are fixed to platform carrier 52.

As best shown in FIGURES 4 and 6, main levers 30 and 32 are pivotally supported from understructure 26 by fulcrum brackets 56 and 58 respectively. Bracket 56 is supported from base 22 by machine screws 59 and extends below main lever 30 as shown in FIGURE 6. To mount lever 30 on bracket 56 for pivotal movement about an axis extending at right angles to the fulcrum axis of transverse lever 34, a pair of knife edges 60 are fixed to lever 30 and seat on bearing blocks 61 which are fixed to bracket 56. Bracket 58, as shown in FIGURE 4, is parallel with bracket 56 and is supported from base 22 by machine screws (one shown) indicated at 62. Lever 32 is seated on bracket 58 by knife edge and bearing block assemblies 63 (one shown in FIGURE 4A) for pivotal displacement about an axis that is in parallel relationship with the pivot axis for lever 30. Assemblies 63 are the same as those just described for pivotally mounting bracket 56, like reference numerals being used for like parts.

From the lever system thus far described it is clear that main levers 30 and 32 are pivotally supported for swinging movement about parallel spaced apart axes. Platform carrier 52 is supported on the arms 46 and 48 of levers 30 and 32 respectively so that a load applied to carrier 52 swings the opposed apexes of levers 30 and 32 upwardly. This motion of levers 30 and 32 is transmitted by compression link assembly 44 to swing transverse lever 32 in a counterclockwise direction as viewed from FIGURE 5.

Referring back to FIGURE 1, a platform base 64 forming a part of platform assembly 36 is fixed to carrier 52 and rotatably mounts a series of parallel spaced apart rollers 66. Rollers 66 may be arranged along a gradual slope to allow packages or cartons to move across platform assembly by gravity.

With the construction thus far described, packages or other loads to be check weighed are advanced in succession over platform assembly 36. As each load moves over rollers 66, it depresses platform carrier 52 to pivot main levers 30 and 32 about their respective fulcrum brackets 56 and 58 with the result that transverse lever 34 is swung in a counterclockwise direction as viewed from FIGURE 5. Suitable unshown underweight and overweight stops preferably are provided to limit the movement of lever system 28. As shown in FIGURE 5, a rod 80 fixed to one end of transverse lever 34 threadedly mounts a back-balance weight 82.

The construction of lever system 28 and platform assembly 36 just described is conventional and well known. Accordingly, further details not essential to an understanding of this invention will not be described. It will be appreciated that other forms of lever systems and platforms may be used in conjunction with the present invention now to be described, and in this respect, it is often desirable to employ some form of motor driven belt.

As shown in FIGURES 1 and 7, the assembly and circuitry for sensing and classifying overweight and underweight movements of transverse lever 34 is mounted in a suitable cabinet 152 having a removable, rearwardly facing cover plate 154 to provide access to the cabinet interior. Cabinet 152 is advantageously rigidly mounted on base 22 to the rear of platform assembly 36.

As best shown in FIGURES 5, 7, and 8 an assembly for transmitting the motion of transverse lever 34 comprises a knife-edge pivot 155 which is rigid with the rear end of transverse lever 34 opposite from back-balance weight 82 and which engages a downwardly facing, V-shaped bearing 156. Bearing 156 comprises a yoke piece which extends vertically upwardly through an opening in the bottom of cabinet 152. The upper end of bearing 156 in cabinet 152 is fixed to the mid-section of a rigid, horizontally extending spacer bar 158 by a cap screw 160.

With continued reference to FIGURES 7 and 8, a pair of parallel spacer members 162 and 164 are formed at their lower ends with reduced diametered, threaded sections extending downwardly through bores in opposite ends of spreader bar 158. Bar 158 is securely clamped between downwardly facing annular shoulders formed on members 162 and 164 and nuts 166 threaded on the lower ends of members 162 and 164. Spacer members 162 and 164 extend vertically upwardly from bar 158 and terminate at their upper ends in threaded, reduced diametered sections which extend through bores formed in opposite ends of another horizontally extending spreader bar 168 spaced vertically above bar 158. Bar 168 is securely clamped in place on the upper ends of members 162 and 164 by nuts 170. With this construction, spreader bars 158 and 168 and spacer members 162 and 164 are rigidly fixed together for movement as a unit.

Still referring to FIGURES 7 and 8, a plate 172 fixed by a threaded connection 174 to spreader bar 168 about midway between the ends thereof extends vertically upwardly and is secured at its upper end to a horizontal flexure spring 176. A coiled tension spring 178 is suitably fixed at its lower end to spring 176. The upper end of spring 178 is secured to a horizontally extending spring mounting plate 180 by a spring tension adjustment assembly 182. Plate 180 is supported vertically above a further horizontally extending mounting plate 184 by three parallel, vertical spacers 186, 187, and 188. Plate 180 is fixed to the upper ends of spacers 186–188 by cap screws indicated at 190. A cap screw 192 threadedly engaged in a downwardly opening, axial, tapped bore in spacer 188 fixes spacer 188 to mounting plate 184. Spring 176 acts as a pointer which cooperates with a fixed indicator 193 to indicate a balanced position of the apparatus.

As shown in FIGURES 7–9, mounting plate 184 is supported on a further horizontal mounting plate 194 by four parallel spacer rods 196, 197, 198, and 199 which are each formed at opposite ends with reduced diametered, threaded sections indicated generally at 200. Mounting plate 184 is seated on upwardly facing annular shoulders formed on spacer rods 196–199 vertically above-mounting plate 194. The upper threaded sections of spacer rods 198 and 199, as best shown in FIGURE 10, extend upwardly through apertures in plate 184 and are threaded into axial, downwardly opening tapped bores formed in spacers 186 and 187. The upper, threaded end sections of spacer rods 196 and 197 also extend upwardly through apertures in mounting plate 184 and receive nuts indicated at 202. With this construction, mounting plate 184 is clamped in place between axially opposed surfaces between rods 198 and 199 and spacers 186 and 187 and also between axially opposed surfaces on rods 196 and 197 and nuts 202.

Still referring to FIGURES 7 and 8, the lower threaded end sections of spacer rods 196–199 extend downwardly through apertures in mounting plate 194 and receive nuts generally indicated at 204. With this construction, mounting plate 194 is fixedly clamped between annular shoulders on rods 196–199 and nuts 204. Plate 194, as shown in FIGURES 7, 8, and 11, is mounted on a base plate 206 by a set of four parallel, upstanding spacers 208, 209, 210 and 211 each having a lower threaded end section extending downwardly through an aperture in base plate 206 and receiving a nut 214. At their upper ends, spacers 208–211 are formed with axially upwardly opening, blind, tapped bores which threadedly receive cap screws 216 extending downwardly through apertures in mounting plate 194. Mounting plate 194 is thus rigidly fixed to the upper ends of spacers 208–211 which in turn are fixed at their lower ends to base plate 206 by nuts 214. Plate 206 is fixed to the base 22 in any suitable manner.

From the foregoing, it will be appreciated that plates 180, 184, 194, and 206 are securely fixed together by spacers 186–188 and 208–211 and by rods 196–199 to provide a rigid frame structure 220 (FIGURES 7 and 8) which is rigidly fixed to base 22. Bearing 156 is suspended from frame structure 220 by the connection provided by spring 178, plate 172, spreader bars 168 and 158, and spacer members 162 and 164. Spring 178 thus biases bearing 156 upwardly into snug seating engagement with knife-edge pivot 155 to apply a balancing moment to transverse lever 34 in opposition to the moment applied to lever 34 by weight 82. When lever 34 is swung in a counterclockwise direction (as viewed from FIGURE 5) as a result of applying a load to platform assembly 36, spring 178 urges bearing 156 upwardly to retain its seating engagement with knife-edge pivot 155. As a result, the application of a load to platform assembly 36 shifts plate 172 downwardly through the combined swinging movement of lever 34 and the bias exerted by spring 178.

In a manner to be described in greater detail shortly, permanent, axially polarized, bar magnets 224 and 226 mounted on opposite sides of plate 172 are adapted to respectively actuate switches 228 and 230 when a load is applied to platform assembly 36. The polarization axes of magnets 224 and 226 are parallel to the vertical path of displacement imparted to plate 172 by swinging lever 34 in opposite directions about its fulcrum axis at 38.

Switch 228, shown in FIGURES 7 and 12, comprises a cylindrical casing 234 enclosing the switch contacts.

Switch 230 which is preferably of the same construction as switch 228, also comprises a cylindrical casing 236 for enclosing the switch contacts. Switches 228 and 230 are respectively mounted on bracket assemblies 238 and 240 which are adjustably mounted on frame structure 220 on opposite sides of sub-assembly of magnets 224 and 226 and plate 172. Bracket assembly 238 comprises a U-shaped bracket 242 having lower horizontal arm sections 244 and 245 integrally joined to an upper, parallel arm section by a vertical cross piece 248. A mounting plate 250 fixed to casing 234 is secured to cross-piece 248 of bracket 242 by nut and bolt assemblies 252.

With continued reference to FIGURES 7 and 12, rods 197 and 199 are formed with smooth, intermediate cylindrical sections which slidably extend through axially aligned apertures formed in bracket 242 to retain bracket 242 and switch 228 against lateral displacement on frame structure 220. Coiled springs 254 and 256 (see FIGURES 7 and 9) respectively surrounding rods 197 and 199 react against arm sections 244 and 245 to urge bracket 242 axially upwardly and into abutment with a stop and adjustment assembly 257. The axis of casing 234 is parallel with the axes of rods 197 and 199 and with the direction of movement of magnets 224 and 226. A pair of leaf springs 258 and 259 (see FIGURE 12) are fixed to bracket 242 and react against rods 197 and 199 to bias bracket 242 laterally outwardly.

Assembly 257, as best shown in FIGURE 13, comprises an indexed adjusting knob 260 which is fixed by a set screw 261 to the upper end of a stud 262. Stud 262 is threaded through a bushing member 263 which non-rotatably extends through an aperture formed in mounting plate 184. Member 263 is formed with a nut head 263a above plate 184 and is externally threaded to receive a nut 264. Nut 264 is threaded tightly against the underside of plate 184 to prevent axial displacement of member 263. Springs 254 and 256 bias section 246 of bracket 242 into abutment with lower end of stud 262. Thus, by turning knob 260 to axially shift stud 262 up and down, bracket 242 is thereby axially shifted in a corresponding direction to adjust the vertical position of switch 228. The vertical adjustment of switch 228 relative to the vertical path magnet 224 varies the region to which magnet 224 must be moved to actuate switch 228.

The construction of bracket assembly 240 is the same as that just described for bracket assembly 238. Accordingly, like reference numerals have been used to designate like parts except that the reference numerals identifying the parts of assembly 240 have been suffixed by the letter "a."

As shown in FIGURES 7 and 8, an adjustment assembly 266 is provided for adjusting the vertical positions of bracket 242a and switch 230. Assembly 266 is of the same construction as assembly 257. Thus, like references, numerals suffixed with the letter "a" have been used to identify similar parts of assembly 266. Springs 267 and 268 respectively surrounding rods 196 and 198 bias bracket 242a into abutment with stud 262a. Thus by turning knob 260a the vertical position of bracket 242a and switch 230 is adjusted in the same manner just described for adjusting switch 228.

Adjustment assembly 182, as best shown in FIGURE 8, comprises a manually manipulatable knob 270 which is fixed on a spring adjusting stud 272. Stud 272 is threaded through a bushing member 274 non-rotatably extending through an aperture in mounting plate 180. A locking nut 276 threaded on bushing member 274 prevents axial displacement of member 274 relative to plate 180 on the underside of plate 180. A stud 277 axially threaded into screw 272 secures the upper end of spring 178 to adjusting screw 272.

By turning knob 270 in opposite directions the tension in spring 178, is selectively varied to adjust the center point in the acceptable weight range. The underweight limit of the acceptable weight range is independently adjustable by turning knob 260a to vertically shift switch 230 relative to magnet 226. The overweight limit of the acceptable weight range similarly is independently adjustable by turning knob 260 to vertically shift switch 228 relative to magnet 224.

With the structure thus far described, it will be appreciated that weight 82 pivots transverse lever 34 to its limiting underweight position when no load sufficient for overcoming the moment applied by weight 82 is placed on or moved across platform assembly 36. When a load having a weight sufficient to overcome the moment applied by weight 82 is placed on or moved across platform assembly 36, the rearward end of transverse lever 34 is swung downwardly, allowing magnets 224 and 226 to be shifted downwardly under the bias exerted by spring 178.

If the weight of the load applied to platform assembly 36 is less than the amount set as the lower limit for the acceptable weight range, both switches remain actuated in closed positions. If the weight of the load on platform assembly 36 falls within the acceptable weight range, magnet 226 is deflected downwardly sufficiently far to enable switch 230 to open. If the weight of the load applied to platform assembly 36 exceeds the amount set as the upper limit of the acceptable weight range, then magnets 224 and 226 are moved downwardly sufficiently far to enable both switch 230 and switch 228 to open.

As shown in FIGURES 7 and 8, a dash pot assembly 280 is provided to dampen the motion of lever system 28 and magnets 224 and 226 to reduce the time needed for allowing the scale parts and magnets 224 and 226 to reach a static position after a load has been applied to platform assembly 36. Dash pot 280 is of suitable, conventional construction and is shown to essentially comprise a cylindrical housing 282 which slidably receives an unshown dampening piston assembly and which is fixed to mounting plate 194 by nut and bolt assemblies 284. A rod section 286 fixed to the unshown piston assembly in housing 282 extends upwardly along an axis that is parallel to and about midway between spacer members 162 and 164. The upper end of rod section 286 is suitably fixed to spacer bar 168 by a screw connection 287. With this construction, movement of magnets 224 and 226, of the motion transmitting linkage connecting magnets 224 and 226 to lever system 28, and of lever system 28 is dampened to increase the speed at which loads can be successively checked on the apparatus of this invention.

Referring now to FIGURE 14, a weight classifying circuit 300 for signalling the presence of overweights, underweights, or acceptable weights is shown. Circuit 300 is connected to a suitable source of A.C. operating voltage by a manual disconnect switch 302 and has a pair of electrical conductors 304 and 306 connected to the terminals of switch 302 as shown. A manual start switch 308 is connected in conductor 304 in series with a fuse 310.

With continued reference to FIGURE 14, conductors 300 and 306 are connected to input terminals on a primary winding 312 of a transformer 314. Transformer 314 has a secondary winding 316 whose terminals are connected to input terminals 318 and 320 of a full wave rectifier 322 in a detecting circuit 324 which contains switches 228 and 230. Connected in parallel across output terminals 326 and 328 of rectifier 322 are a pair of photocells 330 and 332. Photocells 330 and 332 may be of any suitable conventional type such as CDS photo-resistors and, as best shown in FIGURE 1, are respectively mounted by rigid conduits 334 and 336 adjacent opposite sides and just forwardly of platform assembly 36.

With continued reference to FIGURE 1, separate light sources comprising lamps 338 and 340 for photocells 330 and 332 are mounted along the rearward edge of platform assembly 36 adjacent to the opposite sides of cabinet 152. Lamps 338 and 340 are positioned to direct parallel light beams extending over opposite sides of platform assembly 36 at substantially right angles to the direction of movement of packages or the like fed across platform assembly 36. The light beams emitted by lamps 338 and 340 are directed to respectively act upon the sensitive surfaces of photocells 330 and 332 for rending photocells 330 and 332 conductive. With this construction, it will be appreciated that a package or like fed to the checkweigher by a motor driven conveyor 337 (see FIGURE 15) interrupts the activating light beam for photocell 330 as it moves onto platform assembly 36. As the package moves across platform assembly 36, it unblocks the light beam directed at photocell 330, and then, as it moves to the opposite side of platform assembly 36, it blocks the activating light beam for photocell 332. Movement of the package off of platform assembly 36 for removal by a further motor driven conveyor 337a (see FIGURE 15) unblocks the light beam directed at photocell 332. As will be described in greater detail later on, increasing the resistance of photocell 332 by blocking its activating light beam conditions circuits 324 and 300 to signal the weight condition of the load applied to platform assembly 36. Increasing the resistance of photocell 330 by interrupting its activating light beam resets circuits 324 and 300 for checking the weight of the package moving onto platform assembly 36.

Referring back to FIGURE 14, lamps 338 and 340 are connected in series between output terminal 320 of rectifier 322 and a center tap on secondary winding 316. As a result, lamps 338 and 340 are illuminated by closing switches 302 and 308.

To start operation of the checkweighing apparatus thus far described, switches 302 and 308 are closed and conveyors 337 and 337a are energized to feed a series of packages or the like in succession across platform assembly 36. As the first package to be checked moves onto platform assembly 36, it blocks the activating light beam directed at photocell 330. As a result, the resistance of photocell 330 is increased to de-energize a normally energized winding 344 of a reset relay RSC having a set of normally open contacts RSC–1 and a set of normally closed contacts RSC–2. Winding 344 is connected in series with photocell 330 across output terminals 326 and 328 of rectifier 322. Closing of contacts RSC–2 completes a circuit for energizing a pair of proximity coils 346 and 348 which are connected across the rectifier output terminals 326 and 328 in series with a voltage dropping resistor 350 and contacts RSC–2.

Coil 346 is mounted in casing 236 in surrounding relationship with the contacts of switch 230 which, are normally closed. The polarity of current energizing coil 346 is such that an inductive biasing field is set up for holding switch 230 closed against the switch-actuating force exerted by movement of magnet 226 into the acceptable or overweight ranges. Similarly coil 348 is mounted in casing 234 in surrounding relationship to the contact elements of switch 228. Energization of coil 348 sets up a biasing field to hold switch 228 closed in opposition to the switch-actuating force exerted by movement of magnet 224 into the overweight range.

When the package or carton is fed onto platform assembly 36, the impact of the load applied to the scale parts may result in transient peaks which pass through the static levels at which magnets 224 and 226 actuate switches 228 and 230 respectively. This condition, if not avoided, would result in the generation of erroneous weight classifying signals in circuit 300. In accordance with this invention, however, switches 228 and 230 are held closed by energizing coils 346 and 348 to prevent their actuation to opened positions for the period that the activating light beam for photocell 330 is blocked.

In a manner to be described in greater detail later on, opening of contacts RSC–1 as a result of de-energizing relay RSC resets circuit 300 in preparation for classifying the weight of a subsequent load after a preceding one has been removed from platform assembly 36.

As the light-blocking package is fed past the activating light beam for photocell 330 it moves for a short duration between the light beams directed at photocells 330 and 332 where it is fully supported on platform assembly 36, thereby enabling lever system 28 to move toward a static balancing position. The dampened motion of lever system 28, the feed rate of each package across platform assembly 36 and the linear distance between the light beams directed at photocells 330 and 332 are so correlated that lever system 28 reaches a static balance position as the package on platform assembly 36 approaches the region of the light beam directed at photocell 332.

As a result of rendering photocell 330 conductive again by unblocking its activating light beam, relay RSC is re-energized to open contacts RSC–2 and to close contacts RSC–1. Opening of normally closed contacts RSC–2, de-energizes coils 346 and 348 to remove the reverse bias applied to hold switches 228 and 230 closed. Before the light beam directed at photocell 332 is interrupted by the moving package, therefore, switches 228 and 230 are conditioned to be actuated by movement of magnets 224 and 226 to their static positions corresponding to the static position of lever system 28.

Continued movement of the package across platform assembly 36 blocks the activating light beam directed at photocell 332 with the result that the resistance of photocell 332 is increased as the package begins to move off platform assembly 36. By increasing the resistance of photocell 332, a normally energized winding 352 of a read relay RC is de-energized to open a set of contacts RC–1. Winding 352, as shown in FIGURE 14 is connected across output terminals 326 and 328 of rectifier 322 in series with photocell 332.

At this stage of the checkweighing operation, switches 228 and 230 have been conditioned to effect the classification of the weight of the package interrupting the light beam directed at photocell 332. Assuming the package is underweight, magnets 224 and 226 will not have been moved downwardly sufficiently far to enable switch 228 or switch 230 to open. As a result, switches 228 and 230 remain closed when the load on platform assembly 36 is underweight.

With switches 228 and 230 closed, the closing of contacts RC–1 and RSC–1 completes a circuit for energizing a winding 356 of an underweight relay UC which is connected across the rectifier output terminals 326 and 328 in series with switches 228 and 230 and contacts RC–1 and RSC–1. Closing of contacts RC–1 and RSC–1 resulting from movement of the package on platform assembly 36 to a position where it blocks the activating light beam directed at photocell 332 also completes a circuit for energizing a winding 360 of a classifying relay CC. Winding 360, as shown in FIGURE 14 is connected across the rectifier output terminals 326 and 328 in series with contacts RC–1 and RSC–1 and in parallel with the circuit branch containing switches 230 and 228 and underweight relay UC. Classifying relay CC and underweight relay UC respectively have normally open contacts CC–1 and UC–1 connected across conductors 304 and 306 in series with an underweight indicating lamp 362.

From the foregoing circuitry, it is evident that when the underweight package on platform assembly 36 has moved sufficiently far to block the light beam directed at photocell 332, relays UC and CC are energized to respectively close contacts CC–1 and UC–1. As a result, lamp 362 is illuminated to signal the presence of an underweight load.

A holding circuit for relay UC is established through contacts RSC–1, a set of normally closed contacts 400 of a switch 402 and a set of normally open contacts UC–4 which close when relay UC is energized. A holding circuit for relay CC also is established through contacts RSC–1 and a set of normally open contacts CC–2 which close when relay CC is energized.

When the first package moves off of platform assembly 36 to unblock the light beam directed at photocell 332, photocell 332 is again rendered conductive to re-energize relay RC. Normally closed contacts RC–1 are thus opened, but the energizing circuits for relays UC and CC are maintained through contacts UC–4 and CC–2 respectively.

After the weight of the first package is classified, the second package to be checked is fed onto platform assembly 36 where it blocks the light beam directed at photocell 330 to de-energize relay RSC. As a result, contacts RSC–1 open to interrupt the energizing holding circuits for relays UC and CC. De-energization of relays UC and CC open contacts UC–1 and CC–1 to extinguish lamp 362. Assume now that the weight of the second package is within an acceptable weight range. As a result, magnet 226 is shifted downwardly into the accept zone to enable switch 230 to open when the reverse bias applied to switch 230 is removed by de-energizing coil 346 in the manner previously described. For an acceptable weight, therefore, switch 230 will be opened and switch 228 will be closed when lever system 28 reaches its static balancing position.

As shown in FIGURE 14, switch 230 is ganged to a further switch 364 by a linkage schematically indicated at 366. Switch 364 is opened when switch 230 is closed and is closed when switch 230 is opened. Thus when the weight of the load on platform assembly 36 is within an acceptable range, switch 230 is opened and switches 228 and 364 are closed.

With switches 228 and 364 closed, the interruption of the light beam direction at photocell 332 closes contacts RC–1 to complete a circuit through a set of normally closed contacts UC–2 for energizing a winding 368 of an accept relay AC. Opening of switch 230 maintains relay UC de-energized to prevent the establishment of an energizing circuit for lamp 362. De-energization of relay UC also holds contacts UC–2 closed for establishing the energizing circuit for accept relay AC. Contacts UC–2 thus provide an interlock which prevents energization of relay AC when relay UC is energized.

By closing contacts RC–1, an energizing circuit is again completed for relay CC as previously described. As a result, contacts CC–1 are closed, but this does not establish an energizing circuit for lamp 362 since contacts UC–1 are open.

With continued reference to FIGURE 14, energization of relay AC closes a set of normally open contacts AC–1 which is connected across conductors 304 and 306 in series with an accept indicating lamp 370, contacts CC–1, and a set of normally closed contacts UC–3. The branch circuit consisting of lamp 370 and contacts AC–1 and UC–3 are in parallel with the branch circuit containing contacts UC–1 and lamp 362. With this circuitry, therefore, energization of relays AC and CC and de-energization of relay UC completes a circuit for illuminating lamp 370 to signal the presence of a load having a weight within an acceptable range. Contacts UC–3, which are opened when relay UC is energized, provide an interlock to prevent illumination of lamp 370 when underweight relay UC is energized.

Movement of the second package off of platform assembly 36 to render photocell 332 conductive re-energizes relay RC to open contacts RC–1. At this stage of the operation, however, relay AC remains energized through contacts AC–3. The third package to be checked is now fed to platform assembly 36 and blocks the light beam directed at photocell 330 to reset the circuit components for another automatic weight classifying operation by opening contacts RSC–1 to de-energize relay AC and thereby extinguish lamp 370.

Assume now that the third package is overweight. As a result, downward movement of magnet 224 by deflection of lever system 28 to a static overweight position opens switch 228. In the course of deflecting to its static overweight position beyond the accept zone, lever system 28 shifts magnet 226 downwardly past its static position for enabling switch 230 to open. During this period when the package is blocking the light beam directed at photocell 330, however, switch 230 may not be actuated to its opened position owing to the reverse bias applied by energizing coil 346. In any event, opening of switch 228 prevents the establishment of circuits for energizing relays UC and AC.

As shown in FIGURE 14, relay AC is provided with a set of normally closed contacts AC–2 which are connected in series with an overweight indicating lamp 374 and with contacts CC–1 and UC–3 in circuit 300. The circuit branch containing contacts AC–2 and lamp 374 is in parallel with the circuit branch containing contacts AC–1 and lamp 370 as shown. Thus when relay CC is energized as a result of the third package blocking the light beam directed at photocell 332, contacts CC–1 are closed to complete a circuit for illuminating lamp 374 through contacts UC–3 and AC–2 which are both closed since energization of relays UC and AC, under this overweight condition, is prevented as a result of opening switch 228.

As the third package moves off of platform assembly 36 to unblock the light beam directed at photocell 332, relay RC is again energized to open contacts RC–1. When the next package to be checked moves to a position to block the light beam directed at photocell 330, the energizing circuit for relay CC is interrupted to open contacts CC–1 for extinguishing lamp 374. In place of or in parallel with lamps 362, 370, and 374 it will be appreciated that any other signalling devices may be employed such as relays for performing various functions such as rejecting overweight and underweight loads.

In addition to preventing actuation of switches 228 and 230 by magnets 224 and 226, and reverse bias exerted by energizing coils 346 and 348 permit actuation of switches 228 and 230 with a smaller linear displacement of magnets 224 and 226 to improve sensitivity of the checkweighing apparatus.

To test the operation of the checkweigher, switch 402 is provided with a second set of contacts 404 (see FIGURE 14) which respectively open and close when contacts 400 are closed and opened. By depressing switch 402, contacts 400 open to thereby prevent completion of the holding circuits for relays UC and AC. By closing contacts 404, a circuit is completed to energize relay CC as long as relay RSC remains energized. Under these conditions, contacts CC–1 are closed to permit lamps 362, 370, and 374 to be illuminated by manually depressing platform assembly 36.

Referring now to FIGURE 3, a flexure assembly 420 is operatively connected between base 22 and carrier 52 to dampen dynamic shocks resulting from movement of loads over platform assembly 36 and thus substantially prevent platform assembly 36 from objectionably gyrating. Flexure assembly 420 is shown to comprise a pair of rigid, flat-sided stabilizer bars 422 and 424 which extend in parallel spaced apart relation at right angles to the movement of loads over platform assembly 36 and in parallel relation to the pivot axes of levers 30 and 32. Stabilizer bar 422 is secured at opposite ends to carrier 52 by machine screws 426 and spans a rectangular aperture 428 formed in carrier 52 vertically above understructure 26. As shown, bar 422 extends about midway between the pairs of load bearing and knife edge assemblies 53 at opposite sides of carrier 52.

With continuing reference to FIGURE 3, stabilizer bar 424 is spaced forwardly of bar 22 in the direction of load movement over platform assembly 36 and is secured at opposite ends by screws 430 to understructure 26 in spanning relation to the rectangularly shaped aperture defined by understructure 26. Bars 422 and 424 are interconnected by parallel spaced apart, flat-sided leaf type springs or flexure plates 432 and 434 to form a rectangular framework indicated at 436. Preferably, springs 432 and 434 extend between the pivot axes of levers 30 and 32 and are spaced equidistantly from a longitudinal centerline extending equidistantly between the load bearing and knife edge assemblies 53 on either side. Spring stiffeners in the form of relatively rigid flat-sided plates 436 and 438 preferably are respectively secured to springs 432 and 434 between bars 422 and 424.

With the foregoing flexure assembly construction it will be appreciated that movement of a load over platform assembly 36 in the direction shown by arrow 440 flexes springs 432 and 434 along regions extending parallel to bars 422 and 424 to thereby dampen resulting dynamic shocks.

As shown in FIGURE 3, a cover 442 is secured to understructure 26 by screws 444 and extends over the rectangular opening defined by understructure 26.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A checkweighing apparatus comprising a scale having a displaceable platform for supporting a load to be checked, relatively movable magnetic means and magnetically actuatable switch means disposed in magnetically coupled relation, means mounting said magnetic means for movement within a predetermined path adjacent said switch means, means for transmitting the displacement of said platform to effect movement of said magnetic means in said path, said switch means being actuatable by said magnetic means upon predetermined displacement of said platform by a load deviating from a preselected weight range, and means responsive to the actuation of said switch means for signalling the presence of the weight-deviating load.

2. In the checkweighing apparatus defined in claim 1, means for relatively adjusting said magnetic means and said switch means in the direction of said path.

3. A checkweighing apparatus comprising a scale having a displaceable platform for supporting a load to be checked, a pair of independently actuatable magnetic switches, means comprising magnetic means operatively coupled to said platform and movable through a limited predetermined path adjacent both of said switches in magnetic coupled relation with both of said switches, said magnetic means being responsive to the displacement of said platform through preselected underweight, acceptable weight and overweight ranges to actuate said switches in predetermined order, signal means controlled by said switches for classifying the load on said platform as being within one of said ranges, and means responsive to a load moving onto said platform for a predetermined distance for preventing actuation of said switches in response to displacement of said platform.

4. A checkweighing apparatus comprising a scale having a displaceable platform for supporting a load to be checked, a pair of independently magnetically actuatable switches, means responsive to the displacement of said platform through preselected underweight, acceptable weight, and overweight ranges to actuate said switches in predetermined order, signal means controlled by said switches for classifying the load on said platform as being within one of said ranges, means responsive to a load moving onto said platform for a predetermined distance for preventing actuation of said switches in response to displacement of said platform, said means for preventing operation of said switches comprising a pair of coils surrounding the contact elements of respective ones of said switches, and means for energizing each of said coils to produce a magnetic field for biasing the switch associated therewith to a predetermined position.

5. The checkweighing apparatus defined in claim 4 wherein said means for energizing said coils comprises a source of unidirectional operating voltage and means connecting said coils in series across said source.

6. A checkweighing apparatus comprising a scale having a displaceable platform for supporting a load to be checked, a pair of independently actuatable magnetic switches, magnetic means movable with a defined path and responsive to the displacement of said platform through pre-selected underweight, acceptable weight and overweight ranges to actuate said switches in predetermined order, detecting means for sensing the presence of a load moving through a predetermined region on said platform, means mounting said switches and said magnetic means for independent relative adjustment of said ranges, and means controlled by said switches for signalling the weight range within which a load whose presence is sensed by said detecting means falls.

7. A checkweighing apparatus comprising a scale having a displaceable platform for supporting a load to be check and being depressible through successive, preselected underweight, acceptable weight and overweight ranges, a pair of independent switches, means cooperating with said scale to actuate both of said switches to predetermined conditions during movement of said platform in said underweight range, to actuate one of said switches to a condition opposite from its predetermined condition when said platform is displaced into said acceptable range, and to actuate the other of said switches to a condition opposite from its predetermined condition when said platform is displaced into said overweight range, and means controlled by said switches for signalling the weight range within which the load on said platform falls.

8. A checkweighing apparatus comprising a scale having a displaceable platform for supporting a load to be checked, a magnetically actuatable switch, magnetic means movable in a path adjacent said switch for controlling the actuation of said switch, motion transmitting means interconnecting said magnetic means and said platform, said magnetic means being effective to actuate said switch to a predetermined condition when said platform is displaced by a load deviating from a preselected weight range, means responsive to the actuation of said switch to said predetermined position for signalling the presence of the weight-deviating load, means for adjusting said magnetic means along said path, and means for adjusting said switch to vary said range.

9. A checkweighing apparatus comprising a scale having a platform for supporting a load to be checked and being displaceable through successive, preselected underweight, acceptable weight and overweight ranges, first and second independently, magnetically actuatable switches, magnetically coupled magnetic means disposed to move in a path between said switches for controlling the actuation of said first and second switches, motion transmitting means connecting said magnetic means to said platform to effect actuation of said first switch to a predetermined condition by displacement of said platform from said underweight range to said acceptable weight range and to effect actuation of said second switch to a predetermined condition by displacement of said platform to said overweight range, and means under the control of said switches for signalling the range within which the weight of a platform-displacing load falls.

10. A checkweighing apparatus comprising a scale having a displaceable platform for supporting a load to be checked, a counterbalanced lever system for said scale and being movable in a predetermined direction by a load supported on said platform, a support structure fixed against movement relative to said lever system and said platform, spring means mounted on said support structure, motion transmitting means suspended from said support structure by said spring means and connecting said spring means to said lever system, magnetically actuatable switch mounted on said support structure, a magnet mounted on said motion transmitting means for controlling actuation of said switch, and means under the control of said switch for signalling the presence of a platform-displacing load having a weight which deviates from a preselected weight range.

11. The checkweighing apparatus defined in claim 10 comprising a dash pot connected to said motion transmitting means for dampening the motion of said lever system.

12. The checkweighing apparatus defined in claim 10, means for selectively adjusting the position of said switch along a path extending parallel to the path of movement of said magnet.

13. A checkweighing apparatus comprising a scale having a displaceable platform for supporting a load to be checked, means for enabling loads to be checked to move in succession across said platform, a switch, means responsive to predetermined displacement of said platform by a load having a weight deviating from a preselected weight range for actuating said switch to a predetermined operating condition, first detecting means for sensing the presence of a load moving through a predetermined region on said platform, means controlled by actuation of said switch to said predetermined condition for signaling the presence of a weigh-deviating load when sensed by said first detecting means, second detecting means for sensing the presence of each load moving onto said platform before each load moves into said predetermined region, and means responsive to the sensing of a load by said second detecting means for preventing actuation of said switch to its predetermined operating condition.

14. A checkweighing apparatus comprising a scale having a platform for supporting a load to be checked and being displaceable through successive, preselected underweight, acceptable weight and overweight ranges, first and second magnetically actuatable switches mounted on opposite sides of a space, permanent magnet means movable in a path in said space for controlling the actuation of said first and second switches, motion transmitting means operatively connected to said platform for effecting relative motion between said magnet means and said switches to actuate said switches in predetermined order, and signal means controlled by said switches for classifying the load on the said platform within one of said ranges.

15. In a weighing apparatus having a stationary base structure and a movable platform supported on said base structure and being displaceable by a load applied thereto, the improvement comprising flexure means operatively connected between said base structure and said platform for dampening dynamic shocks produced by movement of a load over said platform, said flexure means comprising a pair of laterally spaced apart parallel leaf springs extending essentially parallel to the movement of a load over said platform, and means securing each spring at opposite ends respectively to said platform and said base structure.

16. In a weighing apparatus having a stationary base structure, a pair of main levers pivotally mounted on said base structure for swinging movement about parallel spaced apart axes, a transverse lever pivotally mounted on said base structure, means operatively connecting said main levers to said transverse lever to impart the motion of said main lever to pivot said transverse lever, and a displaceable load-supporting platform operatively supported by main levers, the improvement comprising a pair of laterally spaced leaf spring elements extending at right angles to and between the pivot axes of said main levers, and means securing each of said elements to said base structure and said platform, said elements being flexed by movement of loads over said platform in a direction extending substantially parallel to the pivot axes of said main levers, to dampen dynamic shocks applied by movement of the loads.

17. In checkweighing apparatus comprising a vertically movable member displaceable along a path in proportional response to load introduced into said apparatus, permanent magnet means mounted on said member, two independent magnetically coupled and actuatable switches mounted adjacent said magnet means so as to be controllably responsive to movement of said magnet means along said path, and means operatively connected to said switches for indicating whether said load is within a predetermined weight range.

18. In the apparatus defined in claim 17, means for adjusting the location of said member along said path for varying the control action of said magnet means on said switches.

19. In the apparatus defined in claim 17, means for independently adjusting the positions of said switches relative to said path for varying the limits of said weight range.

References Cited by the Examiner

UNITED STATES PATENTS

| | | | |
|---|---|---|---|
| Re. 25,732 | 2/1965 | Seaborn | 209—121 |
| 1,468,020 | 9/1923 | Hem | 177—189 |
| 2,104,546 | 1/1938 | Pennell et al. | 177—52 X |
| 2,116,895 | 5/1938 | Howard | 177—52 |
| 2,489,899 | 11/1949 | Kniazuk et al. | 177—121 |
| 2,605,096 | 7/1952 | Bradley | 177—189 X |
| 3,006,469 | 10/1961 | Craig | 177—52 X |
| 3,080,936 | 3/1963 | Sher et al. | 177—184 X |
| 3,086,604 | 4/1963 | Fowler | 177—210 X |

FOREIGN PATENTS

| | | |
|---|---|---|
| 580,694 | 8/1959 | Canada. |
| 649,657 | 10/1962 | Canada. |

LOUIS J. CAPOZI, *Primary Examiner.*

LEO SMILOW, *Examiner.*

G. J. PORTER, *Assistant Examiner.*